United States Patent [19]

Barra

[11] Patent Number: 4,726,391

[45] Date of Patent: Feb. 23, 1988

[54] ROTARY SWITCHING DEVICE PROVIDED WITH AN AXIALLY DISPLACEABLE CONICAL CHAMBER

[75] Inventor: Jean Barra, Gardanne, France

[73] Assignee: Aluminium Pechiney, Paris, France

[21] Appl. No.: 885,655

[22] Filed: Jul. 15, 1986

[30] Foreign Application Priority Data

Jul. 26, 1985 [FR] France ................ 85 11918

[51] Int. Cl.$^4$ .................... F16K 39/06; F16K 11/083
[52] U.S. Cl. .................... 137/246; 137/312;
137/625.47; 251/56; 251/280
[58] Field of Search .............. 137/625.47, 312, 246;
251/56, 280

[56] References Cited

U.S. PATENT DOCUMENTS

| | | | |
|---|---|---|---|
| 2,078,231 | 4/1937 | Brisbane | 251/56 |
| 2,153,885 | 4/1939 | Goldberg et al. | 251/56 |
| 3,908,697 | 9/1975 | Witzel | 137/625.47 |
| 4,150,694 | 4/1979 | Halpine | 137/625.47 |
| 4,449,863 | 5/1984 | Ullner | 137/625.47 X |

FOREIGN PATENT DOCUMENTS 476623 9/1951 Canada .................... 251/56

*Primary Examiner*—Arnold Rosenthal

*Attorney, Agent, or Firm*—Dennison, Meserole, Pollack & Scheiner

[57] ABSTRACT

The invention relates to a rotary switching device having a conical chamber permitting modification of the supply to the apparatus to which it is allocated, by reversing the fluids or the directions of circulation of the fluids in the ducts. This switching device comprises: a principal hollow conical body of revolution (10), provided with a plurality of inlet and outlet ports (11) for the fluids intended to be connected to apparatuses by arrival and departure ducts for the said fluids; a conical chamber valve member of revolution having the same conicity as the interior of the body (10), the axis (9) of the body and of the chamber valve member being coincident, this chamber including at least one switching stage, constituted by a plurality of windows cooperating with the aperture of the ports (11) of the body, and at least one internal partition delimiting at least two distinct spaces constituting the channels of the stage; a means for displacing (19) the chamber valve member (26) along its axis (9) to permit the driving-in and the release of the said chamber valve member from the internal wall of the body (10); a means for rotating (70) the chamber valve member about its axis (9) to permit a change in orientation; a sealing means disposed around the windows of the chamber valve member.

17 Claims, 30 Drawing Figures

| FIG. | CHANGE OF | |
|---|---|---|
| | FLUID | DIRECTION |
| 3A,B | YES | NO |
| 4A,B | NO | YES |
| 5A,B | YES | YES |

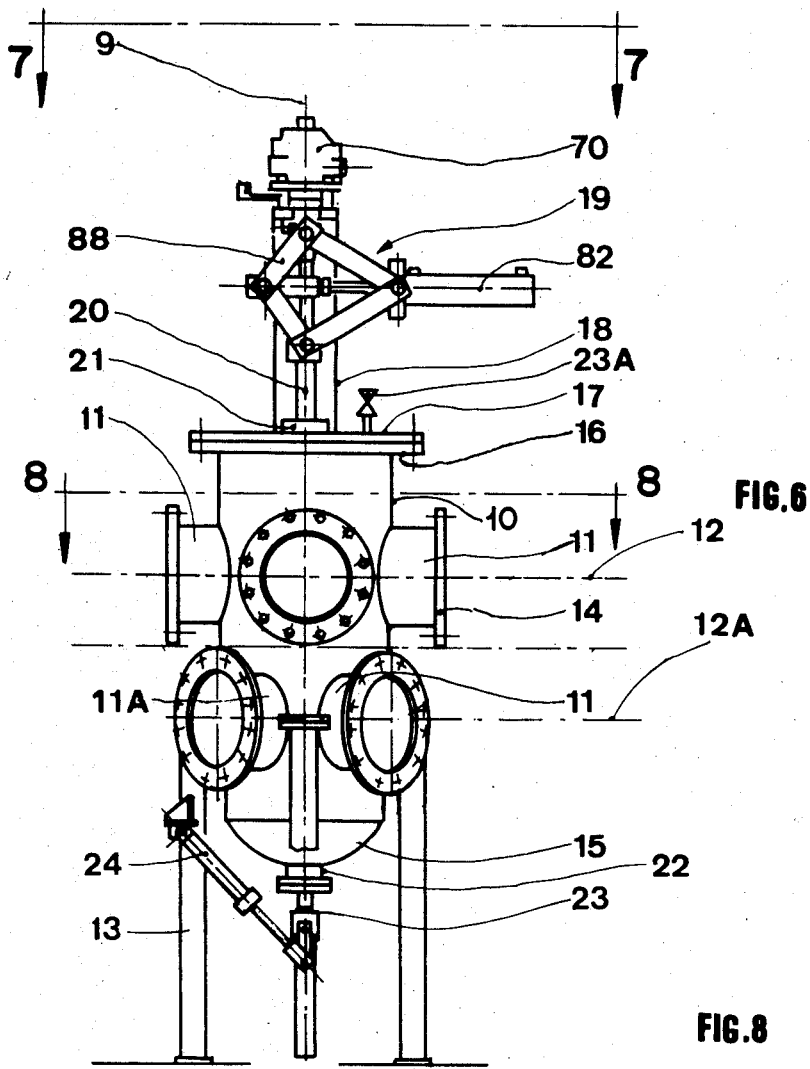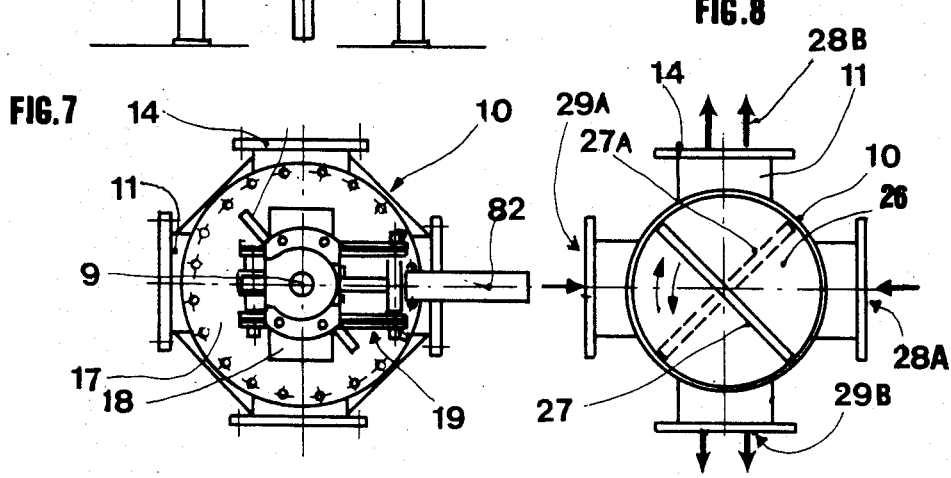

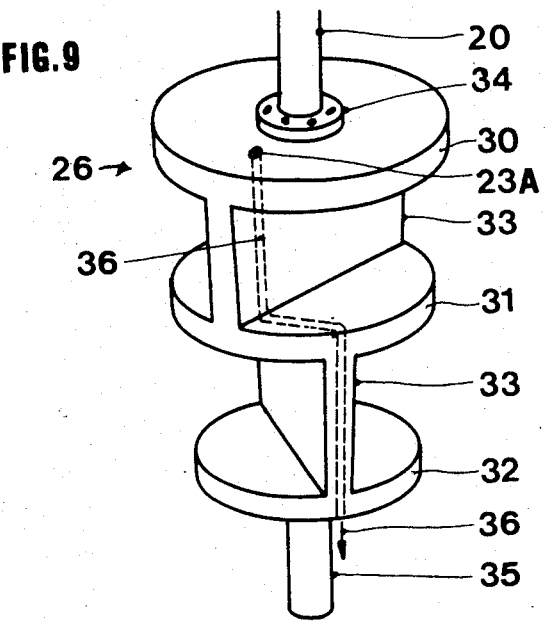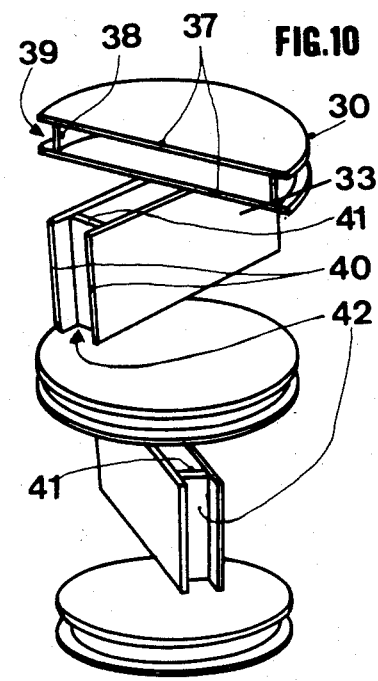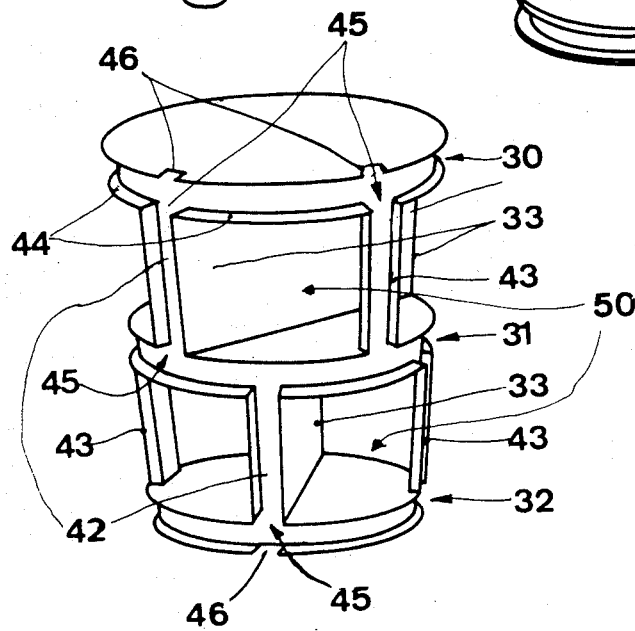

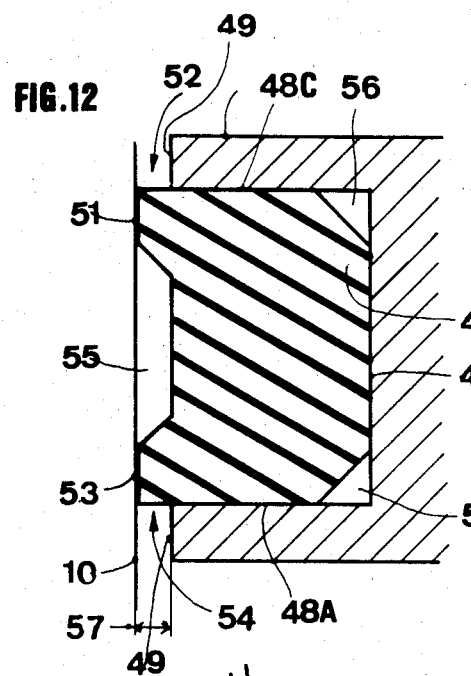
FIG.12
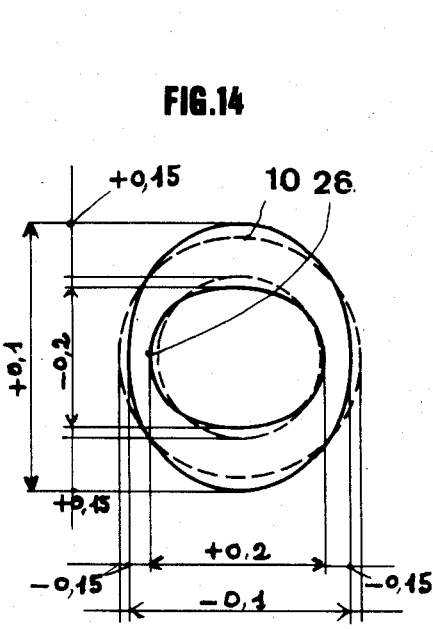
FIG.14
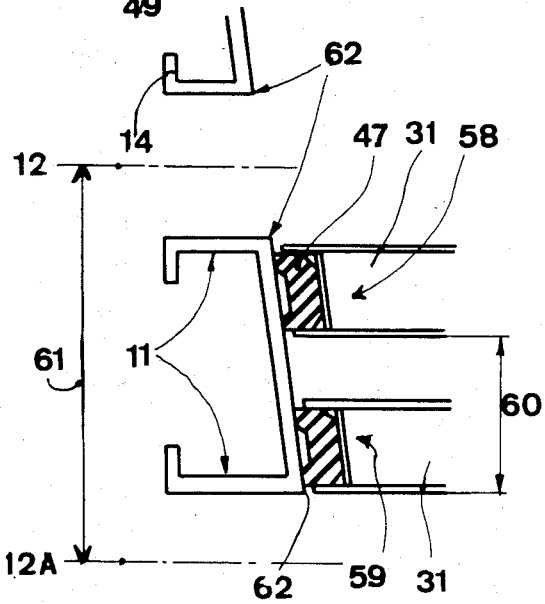
FIG.13
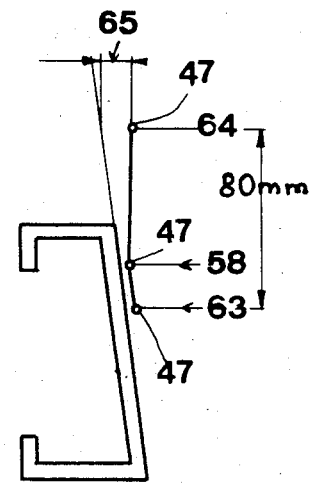
FIG.15

ROTARY SWITCHING DEVICE PROVIDED WITH AN AXIALLY DISPLACEABLE CONICAL CHAMBER

TECHNICAL FIELD OF THE INVENTION

The invention relates to a switching device in which the rotation of the chamber valve member, permitting alteration of the distribution, is effected after the chamber valve member has been raised so as to be disengaged from the body, in such a manner as to require only a small operating couple and not to risk destruction of the joints on passing the apertures of the body.

The use of this switching device relates to the technical field of taps, valves and distributors.

Depending upon its connections with the devices which it serves, this switching device permits, in relation to at least two fluid streams, and without any necessity to stop the flow of the fluids in each of the circuits:

switching of the fluids in the circuits without changing the direction of circulation thereof;

reversal of the direction of circulation of the fluids in each of the circuits without switching the fluids;

switching of the fluids in the circuits while reversing the direction of circulation in each of the circuits.

PRIOR ART

In order to modify the destination or the orientation of a fluid in a network of ducts, or in order to connect a duct temporarily to a different fluid, use is generally made of obturators such as flush joints, taps, valves, distributors, etc. . . . The operation of certain of these obturators and the technological requirements of the devices served may necessitate the prior stoppage of the circulation of the fluid in the ducts which are switched into the circuit.

With the complexity of the circuits in devices such as multiple exchangers, counter-current filters, and also in the case of distribution over lines of devices requiring intermittent supplies, the number of obturators is seen to increase. There is a great effect on the time required for the operations and on the cost of the installation, essentially when ducts of large diameter, for example exceeding 200 mm, are involved.

It is in certain cases necessary to add obturators for the purpose of isolating the circuits which are momentarily switched out, at each one of their ends, especially when such circuits have a fairly great length and when the fluids carried give rise to deposits.

FIGS. 1 to 2 relates to the prior art. They indicate the scheme of distribution by means of obturators such as taps or valves in a tubular exchanger accepting significant differences in pressure and where it is necessary to switch the fluids A and B within the exchanger without, nevertheless, changing the direction of circulation thereof.

In FIG. 1: the fluid A enters at 1 and leaves at 3 the fluid B enters at 4 and leaves at 2.

In FIG. 2: after the various obturators have been operated, the fluid A enters at 4 and leaves at 2, the fluid B enters at 1 and leaves at 3.

In this case, in which no constraint of a process or technological nature obstructs their use, it is seen that it is necessary to provide 8 obturators (5) in order to satisfy, in the circuit, the two cases of operation according to FIGS. 1 and 2.

If there is a risk that the fluids carried will choke the connecting pipes (6) which have a fairly great length, it will be necessary to instal supplementary obturators (7) which are identical to those which have been indicated (5). Finally, it is most frequently necessary to provide in these connecting pipes drainage and washing taps (8) of a dimension less than that of the obturators (5) and (7). Accordingly, up to twenty sectioning devices may be required in such an installation.

It is known that rotary or linear multi-channel distributors replace two or four obturators and in some cases more, and that these distributors may be operated without any necessity to stop the circulation in the ducts which they switch into the system.

Where this transitional period is not accepted by the device which they serve, or indeed where stoppages in the supply circuits are not tolerated by the process, the user has recourse to synchronism or to mechanical twinning of the obturators or distributors, in such a manner as to act simultaneously on the upstream and downstream regions. In some cases, this necessitates a particular dimensioning of the passages within the obturator or the distributor and a slight staggering of the operation of the two of them, in order to avoid, if this is desirable, a transient residual pressure increase during the operation.

FIGS. 3, 4 and 5, which also relate to the prior art, represent a scheme of distribution by means of rotary distributors in a plate heat exchanger, in which the pressure difference tolerated on both sides of the plates is less than the operating pressure. The effect of this is that one side of the plate cannot be supplied unless the other side is also supplied.

In FIG. 3A: the fluid A enters at 1 and leaves at 3, the fluid B enters at 4 and leaves at 2

In FIG. 3B: after the distributors have been operated, the fluid A enters at 4 and leaves at 2, the fluid B enters at 1 and leaves at 3.

The successive operation of the distributors is not permitted, because there would be a risk of creating within the exchanger a pressure different on the two sides of the plates, equivalent to the operating pressure, i.e. greater than the difference tolerated. In these circumstances, it is necessary to operate the two distributors simultaneously in order to pass "smoothly" and without a significant variation of the characteristics of the circuits from the position A to position B of FIGS. 3, 4 and 5. This can be done manually with the risks which this involves, but it is also possible to contemplate an electrical, hydraulic or mechanical connection of the two distributors.

FIGS. 4 and 5 show respective cases of allocation of distributors, whether twinned or not, with which it is possible:

to reverse the direction of circulation of the fluids, without switching them, to switch the fluids in the circuits, while reversing the direction of circulation in each of the circuits.

With particular regard to the rotary distributors, the couple which is required in order to operate the movable element, which is generally referred to as the chamber, or chamber valve member, increases as its size increases, as the fluid which passes becomes less lubricating, but on the contrary exhibits a greater tendency to form deposits, and as the time which elapses between two consecutive operations increases. In twinned distributors, this couple is multiplied by the number of twinnings.

The operation of a metallic chamber in a body which is also metallic is more difficult, and may even become impossible in the case of use with hot fluids, since the chamber valve member. which is more exposed to the temperature than is the body of the distributor, will experience greater thermal expansion than that of the body, thereby eliminating between them the play which is necessary for the rotation of the chamber valve member.

There are in existence remedies, such as complete coating of the chamber or of the body of the distributor with various plastic products having a good coefficient of friction and low adherence to the liquids carried, the thickness of the coating being able to absorb the thermal expansions without a significant increase in the operating couple and also in the systems for lubricating the chamber valve member, which are not always satisfactory, especially when the chamber valve member are of quite large size.

Devices with spherical chamber valve member are known. These give rise to operating coupled which are lower than in the case of cylindrical or conical chambers, but a spherical chamber valve member in a necessarily cylindrical seating of the body of the distributor causes dead zones to appear, in which the particles in suspension in the liquid carried accumulate if the liquid carried contains any such particles and if, in addition, this liquid gives rise to scaling or choking, the operation of the chamber valve member becomes difficult and in some instances impossible, unless means for cleaning these dead zones have been provided.

If consideration is now given to the possible forms of sealing in a chamber valve member or in the body of the distributor, it will be seen that it is necessary to distinguish:

sealing in relation to the exterior
"intercommunications" sealing between the various streams of fluids.

We have seen, in the statements given above, that sealing can be achieved by metal-to-metal contact or by complete coating of the chamber valve member or of the body. However, it may just as well be achieved around the apertures provided in the chamber valve member, through which the fluid passes in order to pass from one to the other of the branches of the body.

In other words, in the chamber valve member of, for example, a 4-channel distributor, the particular joints may be two or four in number, depending upon the design of the chamber valve member.

These particular joints, the principle of which is based on a fairly large plastic deformation of the material which forms them, give better sealing than complete coatings, and furthermore they do not require precision with regard to machining or deformation.

However, during the operation of the chamber valve member, these particular joints pass in front of the apertures formed in the body of the distributor; they are then subjected to rolling stresses by the product which is carried and to shearing stresses at the time when they make contact with the internal wall of the body in order to ensure once again sealing in the selected orientation.

The traditional rotary distributors, whether or not they are twinned, are of a certain interest in the applications which we have cited above, although, when these were designed, little consideration was given to the difficulties which they present.

TECHNICAL PROBLEMS TO BE SOLVED

In view of the statements which have just been made. it would be useful to have available simple or multiple distributors integrated in a single control device, with low or reduced mechanical efforts, even for large dimensions, ensuring the distribution of several distinct fluid streams, with the possibility of switching the fluids themselves and/or their direction of circulation, this taking place without causing significant mixing of the fluids at the time of the switching operations. It would, in addition, be desired to obtain a good seal of the various circuits without having recourse to high-precision machining operations, and without any risk of impairing the joints in the course of the rotation of the chamber valve member. Monitoring of leakage would permit observation of the state of the various forms of sealing. Finally, such a switching device should be compact, should have a low space requirement in comparison with a set of traditional obturators disposed in the network of pipes, and should permit synchronized implementation of the whole sequence of operations.

Throughout the remainder of the present document, we shall agree on the following definitions of terms:

Switching device: The entire device which permits reversal, "switching" of the fluids in the circuits of the apparatus or apparatuses which it supplies, or the direction of the direction of circulation of the fluids within the apparatus which it supplies, or indeed both simultaneously.

Chamber valve member: The movable part which, by its rotation, ensures the switching and the distribution of the fluids.

Body: The envelope within which the chamber is located and which permits, together with the chamber, the achievement of the intercommunication forms of sealing. It includes the various inlet and outlet ports for the distributed fluids, depending upon the position of the chamber valve member.

Channels: The inlet/outlet pairs which the switching device exhibits on a stage in the various positions of the chamber valve member.

Stage: Each group of channels situated in an individual plane perpendicular to the axis of the chamber valve member and of the body.

Orientation: The number of possible positions for one revolution of the chamber valve member. To each one of these there correspond channels which are different from one another.

Distribution: Symbolic representation of the channels by stage. This may be in the form of an "L", "T" or "X", with 2 channels, 3 channels or 4 channels.

Window: Aperture formed in the chamber valve member in order to constitute the channel permitting the transport of the fluid from one branch to the other of the body.

Sealing and control of leaks: All the joints provided for the chamber valve member, these being joints of an appropriate form to ensure a seal around each window and to permit visual inspection of external leaks and intercommunications.

Control mechanism: The device maintained on a bracket and permitting operation of the chamber and regulation.

Bracket: Metallic support, forming a solid unit with the body, on which the control mechanism for the chamber valve member is disposed.

OBJECT OF THE INVENTION

The object of the invention is a rotary switching device provided with a conical chamber valve member, which meets the conditions set forth above, permitting simultaneous modification of at least two distinct fluid streams, by reversing the directions of circulation of the fluids and/or by switching the fluid streams among themselves, without any necessity to stop the fluid streams and without causing significant mixing between these fluid streams at the time of switching, this switching device being characterized in that it comprises:

a principal hollow conical body of revolution, provided with a plurality of inlet and outlet ports for the fluids intended to be connected to input and output devices or ducts for the said fluids, this body being provided, at its upper part, with a closure plate, and at its lower part with a closed base;

a conical chamber valve member of revolution, closed at its upper part and at its lower part, cooperating with the principal conical body and having the same angle of conicity as the said conical body, the axis of the body and that of the chamber being coincident, this chamber including at least one switching stage constituted by a plurality of windows cooperating with the ports of the conical body and at each stage at least one internal partition delimiting at least two spaces for circulation of fluids without internal communication between them, this partition being disposed in a plane parallel to the common axis of the body and of the chamber valve member or passing through this axis;

a means for displacing the chamber valve member along its axis;

a means for rotating the chamber valve member about its axis;

means for creating a seal, disposed between the chamber and the body, between the adjacent windows, and between the upper part of the chamber valve member and the space situated above the chamber valve member, as well as between the lower part of the chamber valve member and the space situated below the chamber.

In the case of two superposed stages, without internal communication between them, each stage of the body includes four ports disposed at 90°, cooperating with the four windows of the corresponding stage of the chamber valve member, the two stages of the chamber valve member being separated from one another by a plate disposed perpendicular to the axis of rotation. Preferably, in the case of a two-stage switching device, the axis of the ports of one stage form an angle of 45° with the axes of the ports of the other stage.

Moreover, the chamber valve member includes, on the periphery of the upper and lower plates, on the periphery of each separating plate between stages, and on the extremities of the internal partitions separating the distinct spaces for circulation of the fluids, an elastomeric seal disposed in a groove.

The details of the invention will now be described in five parts: the body, the chamber valve member, the sealing, the mechanism for rotating the chamber valve member and the mechanism for lifting and driving in the chamber valve member.

DESCRIPTION OF THE FIGURES

FIGS. 6 to 25 illustrate the invention.

FIG. 6 shows an overall view of a two-stage switching device according to the invention.

FIG. 7 is a view from above along lines 7—7, and FIG. 8 a section of FIG. 6 according to lines 8—8.

FIGS. 9, 10 and 11 show the details of construction and assembly of the chamber valve member.

FIGS. 12, 13, 14 and 15 relate to the seal disposed on the chamber valve member.

FIGS. 16A and B are views of the chamber valve member provided with its seals.

FIGS. 17, 18, 19 and 20 relate to the mechanism for rotating the chamber valve member about its axis.

FIGS. 21 to 24 show the device for lifting the chamber valve member.

FIG. 25 indicates the power of the device for driving the chamber valve member into the body of the switching device.

FIG. 6 shows a general view of a switching device on pedestals, according to the invention, placed in a vertical position, having two stages with four channels, together with its control mechanism.

Figure 1:
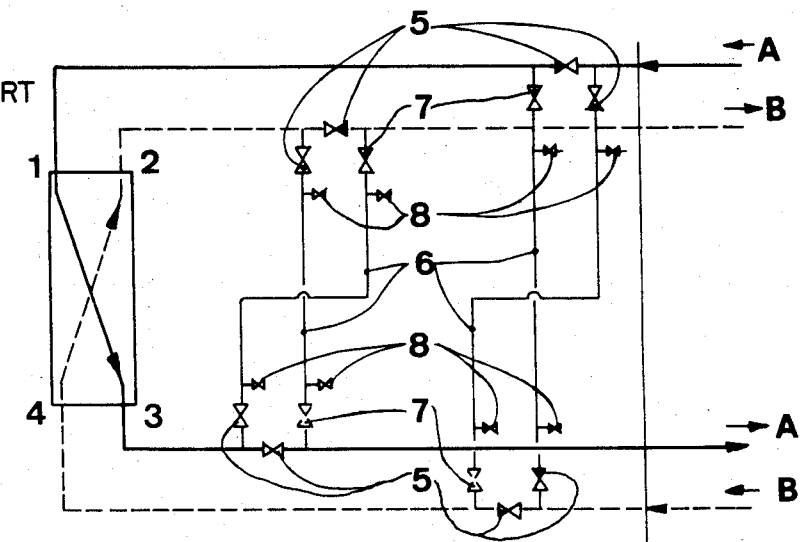
FIGS. 1 to 5 relate to the prior art and have already been described.
Figure 2:
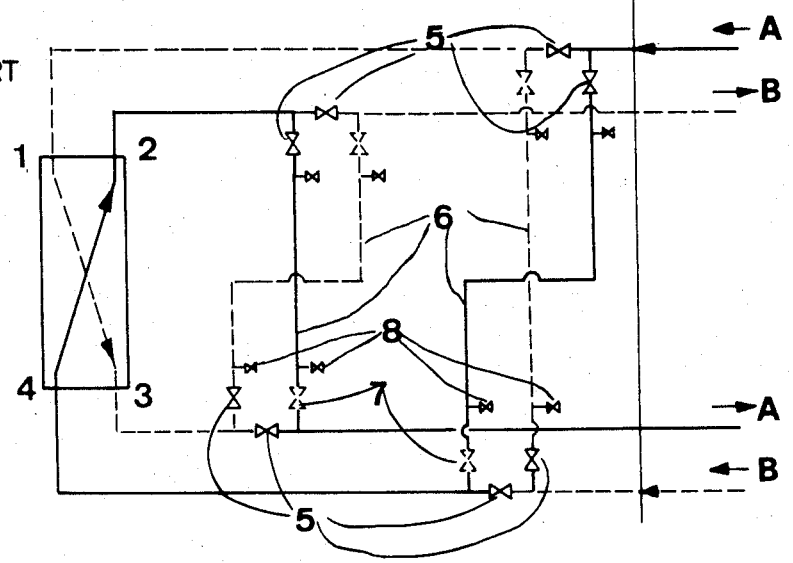
Figure 3A:
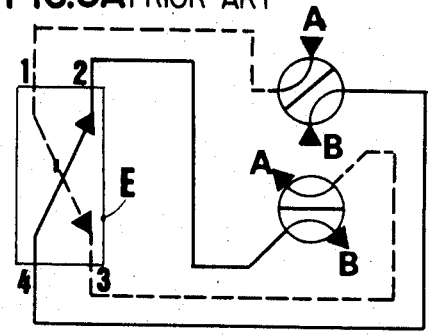
Figure 4A:
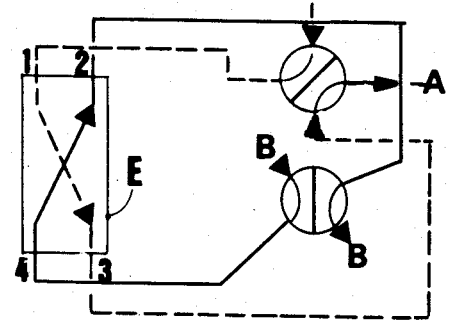
Figure 3B:
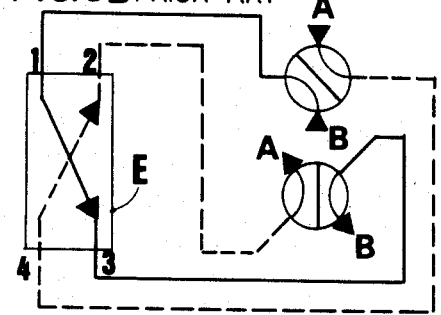
Figure 4B:
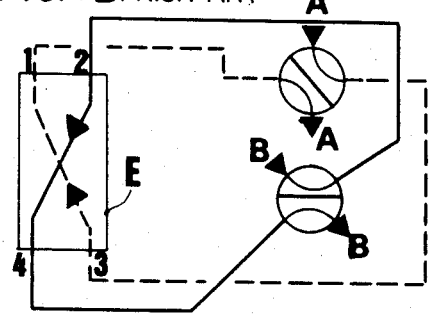
Figure 5A:
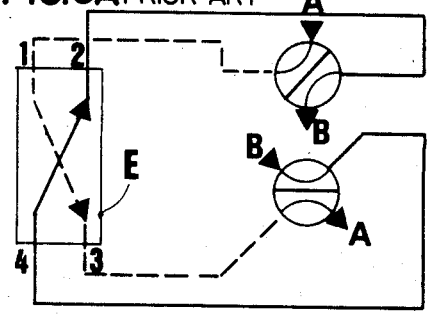
Figure 5B:
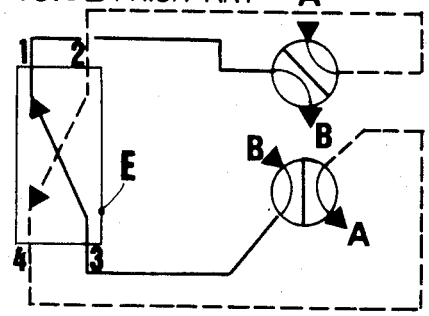

(1) The body (10), which is constructed of a material satisfying the physico-chemical requirements of the fluids carried, is machined to be internally conical. For applications involving products containing approximately 200 grams per litre of caustic soda at temperatures which may reach 100° C., which gave rise to the invention, ferrous metals are completely suitable.

This body includes a plurality of ports (11), those situated in a single plane constituting the inlets and the outlets for the fluids passing through a stage; the two levels of ports (12) and (12A) (in FIG. 6) show that this switching device has two stages. For reasons associated with the design of the body, and likewise in order to facilitate the arrangement of the ducts connected to the switching device, the ports (11) of the second stage (12A) are offset by 45° in relation to those of the first stage (12). In the case shown, these ports include flanges (14) for connection to the ducts.

The body, at its lower part, being the small-diameter end of the cone, is provided with a base which may be soldered (15); the upper part of the body, being the large-diameter end, has a flange (16) receiving a cover (17). On this cover, which is held against the flange of the body by a series of bolts, there is fixed the bracket (18) which supports the entire control mechanism (19) for the chamber valve member, which will be described below. The chamber, being situated within the body, is not visible in this FIG. 6. It is connected to the control mechanism by means of the shaft (20). The shaft (20) traverses the cover (17) by means of sealed mounting (21). When the cover (17) has been removed, the movable assembly comprising the control mechanism (19) and the chamber valve member may be removed in one unit from the body in order, for example, to be replaced by a substitute assembly. It should be noted that the axis of rotation of the chamber valve member and the axis of the body are coincident in a common axis (9). The base (15) includes a port (22) provided with a tap (23) which is controlled by a jack (24) and which is opened in order to permit demonstation of leaks. Within the body, the base includes a collar (25) which is shown in Figure (17). On the upper cover there is provided a tap (23A) for carrying out the internal cleaning of the switching device after the change of orientation of the chamber valve member (26). In the case shown in FIG. 6, the switching device is supported by pedestals (13). FIG. 7 shows a view from above of the switching device, showing the ports (11) and their flanges (14), the upper cover (17) and the bracket (18) supporting the control mechanism (19).

FIG. 8 shows a section of the apparatus, passing through the median plane 8—8 above the ports (11); the partition of the chamber valve member (26) is positioned at (27) so as to constitute two channels 28A, 28B and 29A, 29B. In FIG. 8, the chamber has been displaced through 90° from the position (27) to the position (27A) shown in dotted lines, in order to constitute two different channels 28A, 29B and 29A, 28B.

(2) The chamber

FIGS. 9, 10 and 11 show schematically the chamber valve member intended for a switching device having 2 stages and 4 channels according to the representation of FIG. 6. According to FIG. 9, it is made up of an upper plate (30), an intermediate plate (31) and a lower plate (32). The plates are connected to one another by plane partitions (33). The operating control shaft (20) of the chamber valve member (26) is positioned and fixed by a flange (34), which is integral with the upper plate; the lower plate receives an extension piece (35) which, together with the operating shaft (20), will maintain the chamber valve member centered in the body at the time of the operations, which are most frequently carried out without stopping the fluid streams. A passage (36) passing through the interior of the chamber valve member permits evacuation of the washing liquid introduced at the upper part of the body through the tap (23A), evacuated through the tap (23) placed on the base (15) (FIG. 6). The chamber valve member may be constructed of welded steel sheet, the quality of which will be selected as a function of the physico-chemical requirements of the product carried.

FIG. 10 shows in its upper part a plate (30) cut by a plane passing through its axis of revolution. A plate is made up of two discs of sheet metal (37) and of a cylindrical ferrule (38) joining these two discs of sheet metal. The diameter of the ferrule (38) is smaller than the external diameter of the discs (37), the purpose of this being to form at the periphery of the plate a rectangular groove (39) of large dimensions, in which groove the seal will be placed. The partition (33) is constituted by two sheet metal plates (40) which are joined to one another by struts (41). As for the plate, the struts (41) are fixed by welding so as to stand back from the lateral edges of the metal sheets (40) to constitute a rectangular groove of large dimensions (42), in which groove a double seal (47) will be placed (FIG. 12).

The assembly of FIG. 10 shows the composition of the chamber valve member, the various components of which are then connected by welding, while maintaining the relative position of the partitions which is indicated in FIG. 10 and 11.

Figure 16:
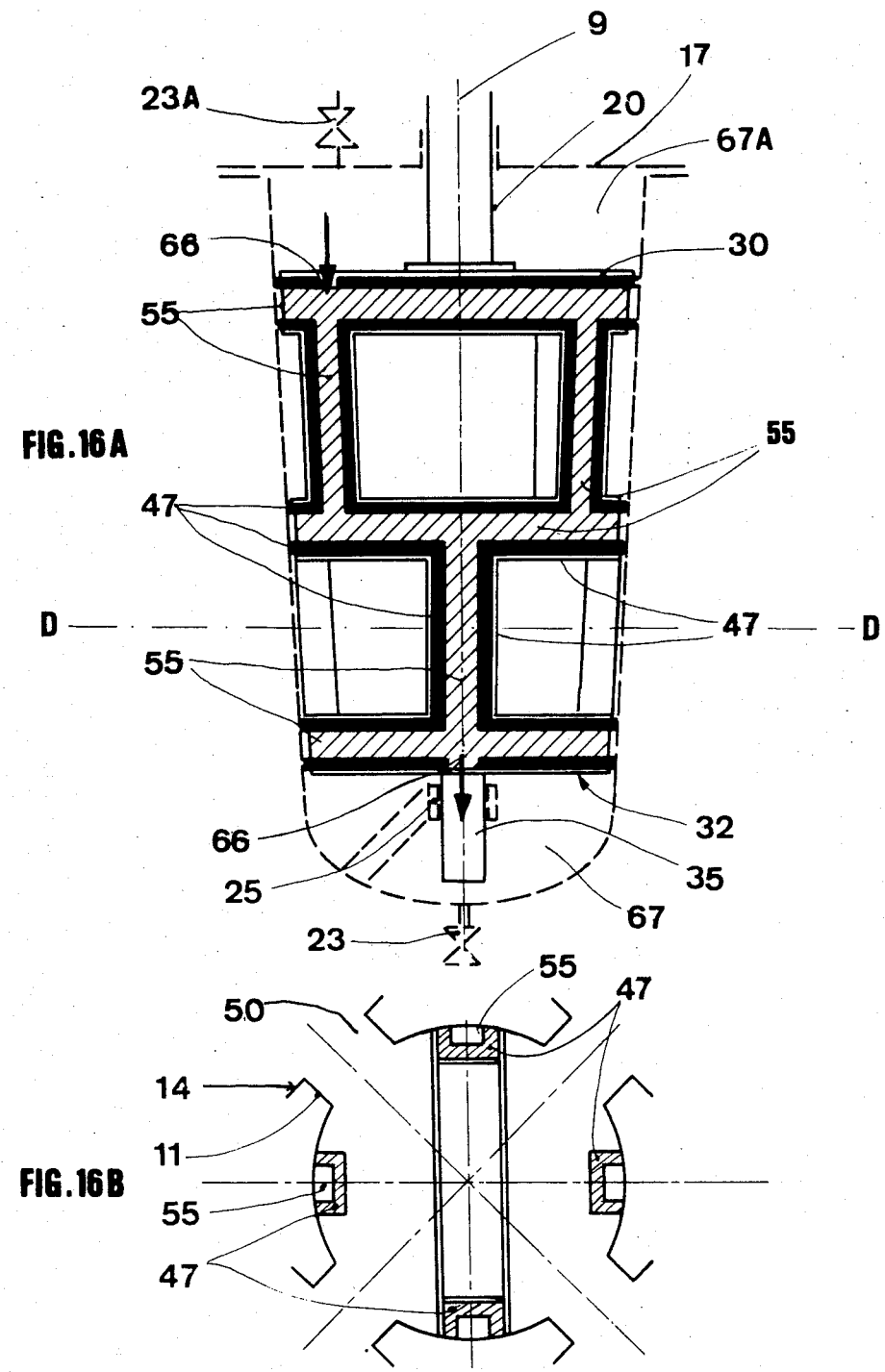

FIG. 11 represents the chamber (26) in its overall design with reference to the elements which form the same, plates (30) and (31) and (32), as well as partitions (33). It is possible to see at each stage two bars (43) forming a hollow profile having the dimensions of the grooves (42). The function of this bar is two-fold; it connects to each other the two plates of a stage in order to improve the mechanical stability of the assembled chamber valve member, and it likewise receives a seal (47) FIGS. 12-16), which will maintain a clean seating, on the body, of the bearing surface of the seal which is not used for a given orientation of the chamber valve member (FIG. 16B).

The elements of discs (37) constituting the plates which intercept the rectilinear grooves (42) which are exhibited by the partition (33) and the bars (43) are cut at (45) to the profile of the groove (42) in order to obtain continuity in the grooves, which will permit the joining of the seals to the connections.

As soon as the chamber valve member has been formed by welding and stress-relieved, it is subjected to the action of a machine tool in order to obtain the correct conicity on the various discs (37), on the edges of the metal partition sheets (40) and on the bars (43). The circular and rectilinear grooves are likewise machined to receive the seal under the best conditions. It is at this precise moment that the elements of discs (46) disappear. At the time of machining, the external discs (37) of the plates (30) and (32) are notched at (46) in order to provide a passage for any possible leaks and for the washing liquid introduced through the tap (13A).

(3) The seal between the body and the chamber valve member

The periphery of the plates and the lateral extremities of the partitions are inscribed in a cone of revolution delimiting the chamber. The free, or empty, space of the cone of revolution inscribed in the chamber valve member, delimited by the plates at the lower part and at the upper part and by the lateral extremities of the partition constitute the window, or openings, (50) in the otherwise solid chamber valve member, this being a window around which it will be necessary to obtain a seal.

The disk-shaped plates (30), (31), (32), the partitions (33) of large thickness which make up the chamber valve member (26) and the bars (43) exhibit at the external periphery broad grooves of rectangular section, circular grooves (39) on the plates and rectilinear ones on the bars (43) and the partitions (33). They communicate with one another so as to receive a seal (47) in the form of a solid U (FIG. 12) joined to the connections and made to adhere to the internal walls of the grooves.

Each extremity (51, 53) (FIGS. 12-13) of the limbs of the U formed by the seal provides a particular sealing action at each window of the chamber valve member, and the part of the seal situated between the two limbs of the U forms a space (55) leading towards the exterior any possible leakage caused by a fault on one of the extremities of the limbs of the U. On the (upper and lower) end plates delimiting the chamber, the limbs of the U which are situated alongside the extremity of the chamber valve member are eliminated locally (66) in order to permit the conduction of any possible leakage towards the exterior (FIG. 16A).

The sealing of the chamber valve member (26) within the body (10) is obtained by deformation of this seal (47).

It is the conical shape of the body and of the chamber which permits such deformation of the seal by driving the chamber into the body. Such driving-in gives rise to large axial stresses. The control mechanism must be devised as a function of these stresses; it is clear that the stresses, in order to release the chamber valve member after a fairly long period of operation, are greater than those required for the deformation of the seal. In order to facilitate the rotation of the chamber valve member within the body, it is preferable that the seal (47) should no longer be in contact with the wall of the body (10), and it is necessary, in addition, to prevent the seal, during its deformation, from passing in front of the edges of the apertures of the body, which would run the risk of exerting a shearing action thereon.

FIG. 12 shows, in the grooves such as (39) or (42) formed in the chamber, the U-shaped profile of the seal (47) which is specially devised for this application.

The adherence of the seal (47) on the three faces (48 A,B,C) of the groove imparts thereto a very good resistance to the differences in pressure at the times when it passes, while released from the body in front of the apertures of the body, while the fluid streams have remained intact. The double bearing surface of the seal imparts a specific sealing property to each one of the channels of a stage. The bearing surface (51) forms a seal on the channel (52), and the bearing surface (53) forms a seal on the channel (54). If a leak appears on the bearing surface (51) or on the bearing surface (53), it proceeds via the path (55) which is formed by the seal between these two bearing surfaces and via the notches (66A) towards the lower part of the body, from which it is evacuated through the tap (23) (FIG. 16A). Under the stress of deformation, the seal (47), which is virtually incompressible, yields, the freer zones (56) of the groove taking up the substance of this yielding, the bearing surfaces (51) and (53) being only slightly deformed by such deformation. It is seen, as has been stated in the preceding paragraph, that the seal is offset in relation to the metallic groove at (57) in order to prevent the edges (49) of the grooves, on deformation, from coming into contact with the internal wall of the body (10).

FIG. 13 shows two limiting positions of the seal (47), pertaining, for example, to the intermediate plate (31), in relation to the ports (11) of the stages (12) and (12A) and the body (10). The position (58) corresponds to the driving-in of the chamber into the body for nil deformation of the seal, while the position (59) corresponds to the lower limit fixed for the driving-in of the seal, once it has been deformed; the spacing (60) between these two positions is dependent on the dimensioning of the ports, on the distance between their axes (61) and on the width of the seal. For ports of 250 mm, for example, with a seal width of 65 mm, the value of this spacing (60) is 80 mm. It thus permits quite large tolerances in the construction of the components, and permits compensation for the subsidence which the seals experience with the passage of time. The system of regulation of the driving-in of the chamber valve member which will be described below takes due account of this value. Thus, at any time, the seal will not pass in front of the edges (62) of intersection of the ports with the bore of the body while it is still deformed; accordingly, there is not risk of shearing of the seal.

FIG. 14 and the values which are shown thereon indicate that, having regard to the machining tolerances required on the bore of the body (10) (plus or minus 0.1 mm) and on the bearing surfaces of the seal of the chamber (plus or minus 0.2 mm), the differences in elevations on the radii amount to plus or minus 0.15 mm. Moreover, measurements carried out on a prototype device have led us to fix at 1 mm the average deformation of the seal, which amounts of stating that the local deformation of the seal may be, in the limiting cases, between 0.85 and 1.15 mm.

FIG. 15 shows the seal (47) materially represented by a point at position (58) of FIG. 13. The value of the conicity of the bore of the body and of the chamber valve member is 6% (3% slope on the generatrix), and the extent of driving-in of the chamber valve member to enable the seal (47) to reach the position (63) with a deformation of 1 mm will be 1/0.03=34 mm. This is the distance between the position (63) and the position (58).

In order to facilitate the rotation of the chamber valve member in the recorded position, without having recourse to accurate guides on the extension piece (35), the track is fixed at 80 mm (this is the distance between the seal (64) and the seal (63)). As a result of this, the chamber valve member being raised, the seal is situated in the position (64) and its distance (65) from the wall of the body is then (80−34)×0.03=1.4 mm. The axial displacement for the approach of the seal from the position (64) to the position (58) is 80−34=46 mm.

FIG. 16A shows an external view of the chamber valve member (26) equipped with its seals (47). The part "in black" represents the bearing surfaces, such as (51) and (53); the hatched part represents the path (55) situated between the bearing surfaces. The external bearing surface of the seal of the plate (32) is eliminated locally at (66), in order that any possible leakage on one of the bearing surfaces of the seal should reach the lower zone (67) of the body connected to the atmosphere through the tap (23), thus permitting visual inspection of leakages. The same cutaway (66) is effected on the external bearing surface of the plate (30) in order to permit the washing liquid introduced into the upper zone (67A) through the tap (23A) to reach the lower zone (67) via the paths (55).

After having been equipped with the seal, the chamber valve member (26) is once again subjected to the action of the machine tool so as to be machined in a conical configuration with a fairly large tolerance, the bearing surfaces of the seal which are offset in relation to the metallic parts of the grooves having been machined in the first place to a value suitable to ensure a deformation of the seal without any risk of the metal of the chamber valve member coming into contact with the interior of the body.

(4) Mechanism for operating the chamber valve member

This mechanism will be described in the particular case of the switching device having channels of diameter 250 mm and exhibiting a conicity of 6%, as already described.

The mechanism must provide the chamber valve member, under conditions of low stress, with a 90° rotary movement in one direction, and then in the other, in order to be able to return to the initial position, and for example an axial movement of 46 mm in order to displace the chamber valve member, without stress, and then to drive it over a distance of 34 mm into the body in order to deform the seals by 1 mm with a stress which may be large, and to provide an axial stress to release the seals which is greater than the driving-in stress. Moreover, the device must permit the regulation of the driving-in of the chamber valve member taking due account of the production tolerances and of the maintenance of the mechanical properties of the seal, that is to say regulation of a capacity of 80 mm. The system must be irreversible, in order that it should not be necessary to maintain on the chamber valve member, during operation of the switching device, the force to overcome the hydraulic thrust.

A description will subsequently be given of:
the rotary movement
the axial movement and stresses, and the regulation of the driving-in.

Figure 17:
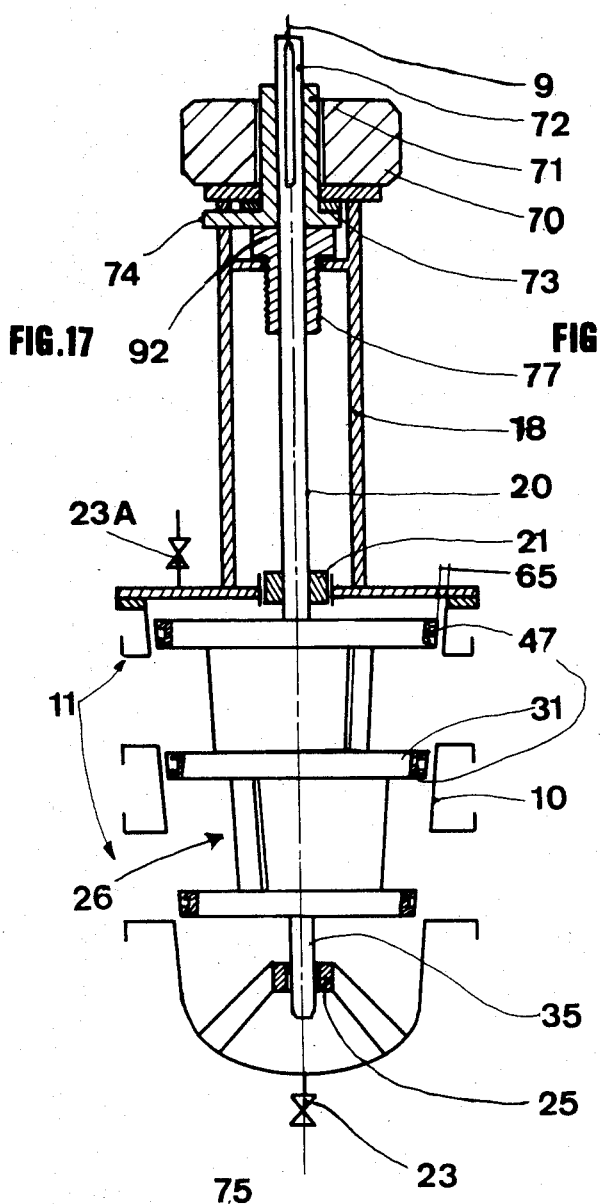

FIG. 17 shows the system giving the rotary movement. The chamber valve member (26) is raised by the system which will be illustrated in FIG. 21, and the seals (47) are no longer in contact with the interior wall of the body (10).

The taps (23) and (23A) are closed, as the fluid streams have not been cut off at the ports (11). These fluid streams transmit transverse stresses to the chamber valve member, which are compensated by guiding within the casing (21) providing the seal for the control shaft (20) and by the lower extension piece (35) of the chamber valve member in the bearing (25). By virtue of the space (65), the rotation is then possible without great stress. At the end of the bracket (18) there is fixed a rotary actuator (70). The movable part of the actuator impresses its rotary movement on the sleeve (71), within which there slides the control shaft (20) driven to rotate by the sliding pin (72). The sleeve (71) includes an abutment (73) positioning it longitudinally on the bracket (18). A crank (74) abutting against end stops (75) which form a solid unit with the bracket limits the rotation of the chamber.

Figure 18:
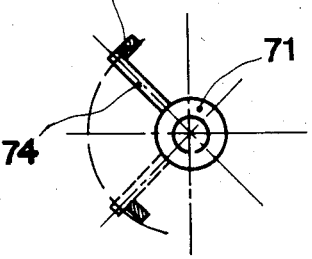

FIG. 18 shows the position of these ends stops (75).

Figure 19:
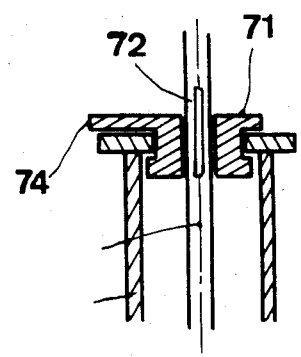
Figure 20:
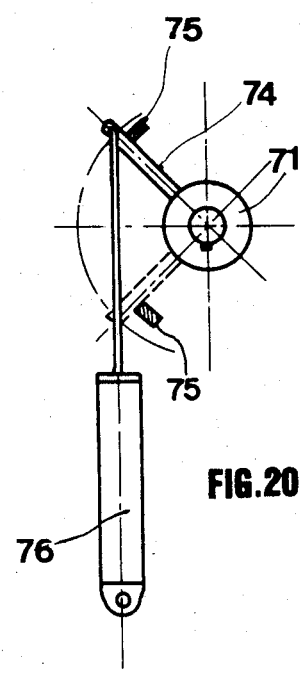

FIGS. 19 and 20 show a variant of the solution according to FIG. 17, in which the actuator is a linear jack (76) acting on the linkage (74) belonging to the sleeve (71). The track is limited by the abutments (75) forming a solid unit with the bracket (18). The position of the crank (74) or an index located on the sleeve (71) permits it to be known in which one of the two possible orientations the chamber is situated.

Figure 21:
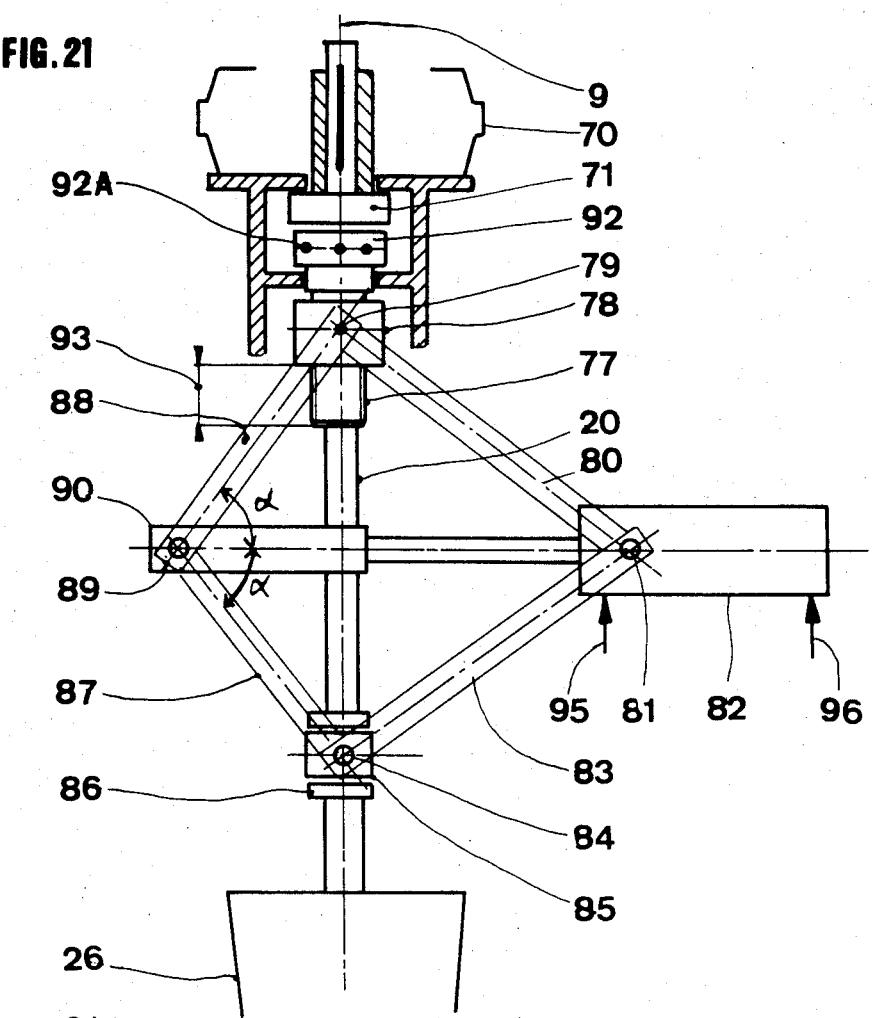

FIG. 21 shows the system providing the axial downward and upward movement of the chamber valve member. On a threaded portion (77) of the screw (92), which is not affected by the rotation and the longitudinal displacement of the control shaft (20) which traverses the same, there is disposed a nut (78) which is likewise threaded and which includes two diametrically opposed posts (79), on which there are articulated by one of their ends twin connecting rods (80) (the figure shows only one of these). By their other end, these connecting rods (80) are articulated onto the posts (81) of a linear hydraulic jack (82). On these same posts (81) there are articulated other connecting rods (83) having the same length as the connecting rods (80). The other end of the connecting rods (83) is articulated onto the posts (84) of a nut (85) which is free to rotate but positioned on the shaft (20) by two abutments (86) belonging to the shaft. A similar system is disposed on the other side of the shaft (20) with twin connecting rods (87) (88) of the same length, which is different from the length of the connecting rods (80) and (83). These connecting rods are coupled to two posts (89) belonging to the particular cap (90) of the jack (82). The entire movable system is supported by the posts (79) and (84), and the quadrilateral formed by the connecting rods will be deformed under the action of the hydraulic jack, in order to modify the distance between the posts (81) and (89), and to this will correspond a variation of the distance between the axes of the posts (79) and (84); as the post (79) is positioned by the nut (76) on the sleeve (71) only the post (84) will be displaced, entraining the control shaft (20) by means of the nut (85) and abutments on the shaft entraining the chamber valve member (26).

In FIG. 21, the chamber (26) is in the upper position, and its seals are released from the wall of the body.

Figure 22:
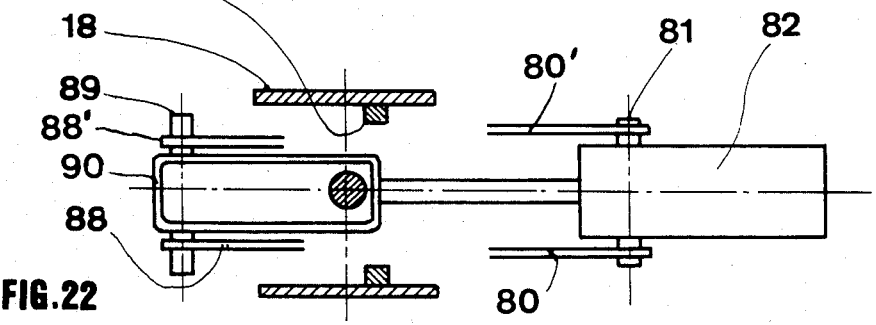

FIG. 22 is a partial section through a plane passing above the jack; it is possible to see in this figure the bracket (18), the particular cap (90) of the jack (82). The excess length of the shaft (89) and the abutments (91) on the bracket (18) will be noted.

On the screw (92) there is represented a series of holes (92A) which will permit, with the use of a mechanic's key, turning of the screw in the bore of the bracket (18). By means of the thread (77) provided on the sleeve (71) and on the nut (78), the nut will be displaced with the posts (79), which will entrain in an axial displacement, without deforming the same, the assembly comprising the quadrilateral, with the jack and the control shaft (20) connected to the chamber valve member (26). The regulation of the driving-in of the chamber valve member is thus obtained with an amplitude corresponding to the length of the thread (93) available on the screw (92) (eighty millimeters in the case under discussion).

Figure 23:
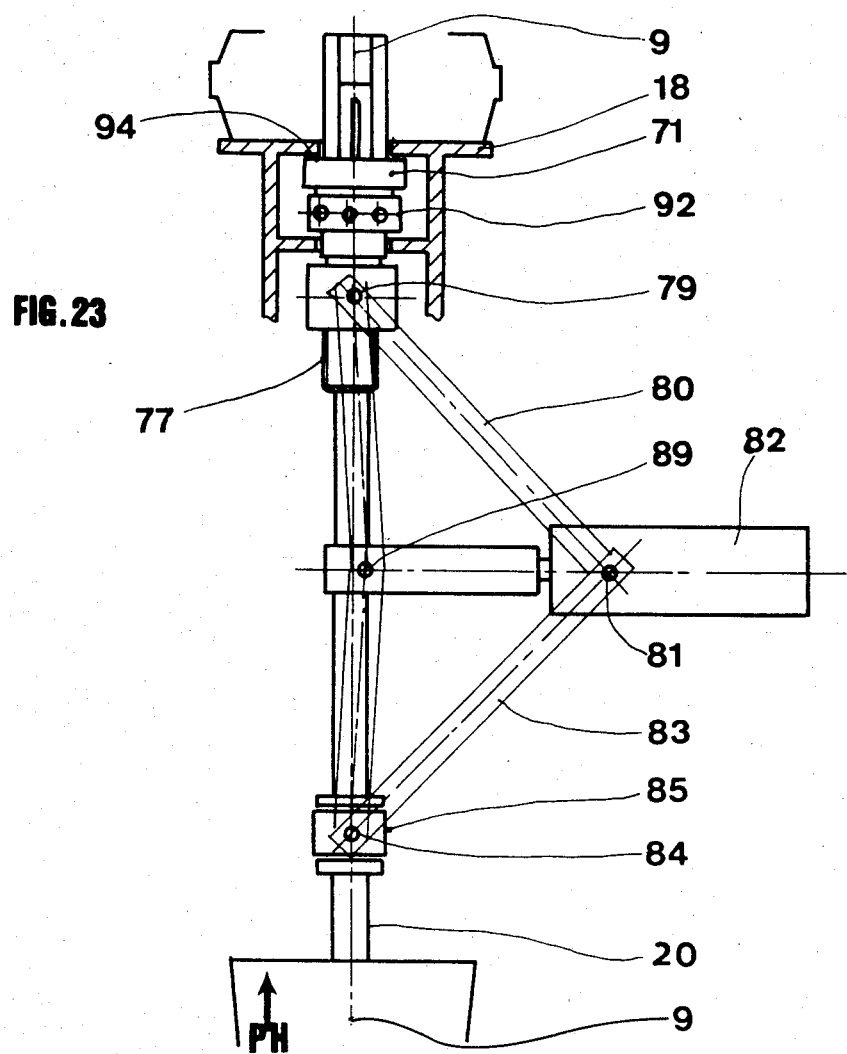
Figure 24:
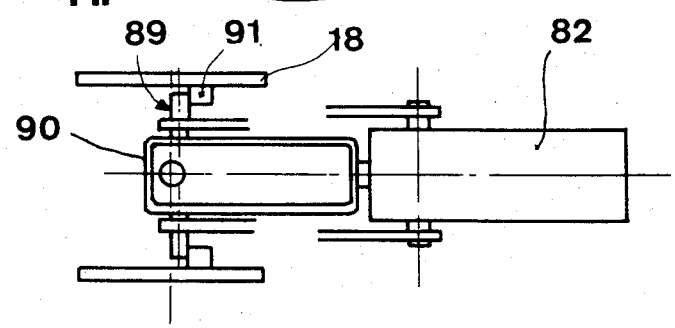

FIG. 23 shows the control mechanism; the jack rod being withdrawn, the chamber valve member is in the lower position, driven into the body, and the seals are deformed. It is then seen in FIG. 24 that the extremities of the posts (89) are pressed against the abutments (91) of the bracket (18), in order to limit the track of the chamber valve member.

In FIG. 23, the posts (89) have cleared the straight line joining the posts (79) to the posts (84). A thrust PH exerted on the shaft (20) by the chamber valve member subject to differential pressures of fluids in the body will not be able to modify the shape of the quadrilateral, because the substance of the thrust PH is transferred by means of the connecting rods, the posts (79) and the sleeves (71) to the point (94) of the bracket (18). Only a small residual force is transmitted to the abutments (91) of the bracket (18) by the extremities of the posts (89). The system is in equilibrium and it is therefore not necessary to maintain the pressure in the jack (82) when the chamber valve member is in its driven-in position. The stresses required in order to ensure the axial displacements of the chamber valve member, both upward and downward, when the seals (47) are no longer in contact with the wall (10), are essentially dependent on the frictional forces of the mechanism and on the sealing properties in the casing (21). They increase very rapidly, as soon as the seals of the chamber come into contact with the wall of the body, and as soon as the chamber valve member is driven into the body in order to deform the seals.

The pressure in the jack is dependent upon the resistive force along the control shaft (20) and the various frictional forces in the articulations, which are negligible in comparison with the forces required for driving-in.

Figure 25:
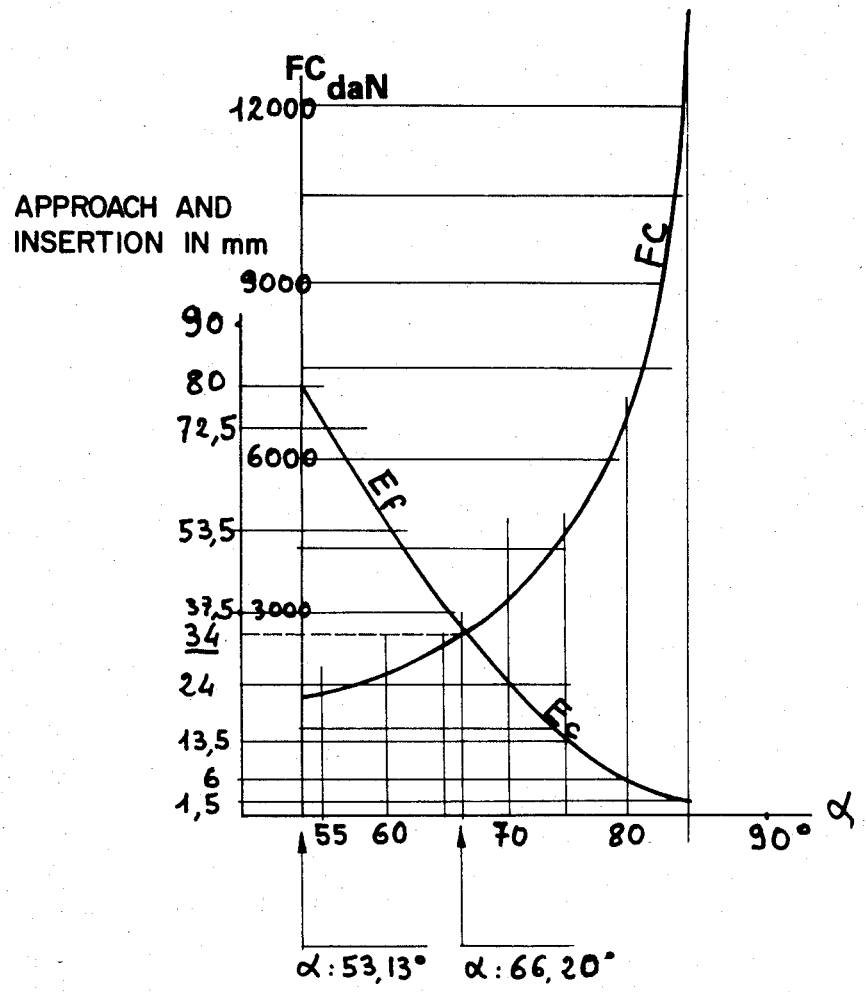

In order to demonstrate the benefit of the quadrilateral system, it will be shown how the thrust force FC on the control shaft (20) varies as a function of the angle formed by the connecting rods, for a constant traction value FV given by the jack rod (FIG. 21). It is the chart in FIG. 25 which indicates the variation of FC between 53.13° and 90°, for a value of FV of 2000 daN provided by a jack operating at 100 bar.

At the outset, for $\alpha = 53.13°$, the quantity FC is approximately 1900 daN, and it approaches 3000 daN for $\alpha = 66.20°$, when the deformation of the seal commences. For $\alpha = 85°$, although the point (75) is situated 1.5 mm from total driving-in, FC has passed beyond the 12000 daN.

Ef and Ec show respectively the development of the approach (Ef) for $\alpha$ between 53.13° and 66.20°, and the development of the deformation (Ec) of the seal, in mm, for α between 66.20° and 90°.

FIG. 21 clearly shows that the jack (82) supplied at (95) works on the rod side in order to effect the driving-in of the chamber valve member. To withdraw the chamber, the jack, supplied at (96), will impart to FC a greater value than at the time of driving-in, generally twice as great, since in the jacks which are currently employed the section of the rod is substantially equal to one half of the section of the piston.

APPLICATION

As assembly of eight switching devices having one and two stages, and having four channels of diameter 250 mm per stage, according to the invention, has been utilized in a factory for the production of alumina from bauxite according to the BAYER process. They have been placed on ducts transporting aluminium trihydroxide suspension, at several hundreds of grams per litre, into sodium aluminate having a high content of $Na_2O$ and at a temperature which may reach 85°–90° C., and at a flowrate of the order of 600 m³/h.

At a rate of one to several operations per day, and without any maintenance having been necessary, they operate in an entirely satisfactory manner, and after several months there was no observation of any increase in leakages, even insignificant ones, at the drainage tap (23).

A switching device having two times four channels of diameter 350 mm, intended for flowrates of approximately 1000 m³/h, which was put into service more recently, has provided until this day a service without failure and with perfect operation.

I claim:

1. Rotary switching device having a conical chamber valve member permitting modification of the supply to the apparatus to which it is allocated by reversing the fluids in the ducts, or by reversing the direction of circulation of the fluids in the ducts, or both simultaneously, without any need to stop the fluid streams and without causing significant mixing of the various fluids at the time of switching, characterized in that it comprises:

a principal hollow body of revolution (10), provided with a plurality of inlet and outlet portions (11) for the fluids intended to be connected to apparatuses by arrival and departure ducts for the said fluids, this body (10) being provided, at its upper part, with a closure plate (17) permitting the location of the chamber valve member, and, at its lower part, with a closed base (15), a conical chamber of revolution (26) having the same conicity as the interior of the body (10), the axis (9) of the body and of the chamber valve member being coincident, the said chamber valve member being closed at its extremities by plates (30) and (32) and including at least one switching stage constituted by a plurality of windows (50) cooperating with the aperture of the ports (11) of the body, and at least one internal partition (33) delimiting at least two distinct spaces constituting the channels of the stage permitting the internal circulation of the fluids without communication between them, and wherein said plates (30), (31) and (32) and the partitions (33) constituting the chamber valve member (26) include grooves (39) and (42) receiving the sealing means;

a means fixed on the upper closure plate (17) for displacing (19) the chamber valve member (26) along its axis (9) in order to permit the driving-in and the release of the said chamber valve member from the internal wall of the body (10);

a means fixed on the upper closure plate (17) for rotating (70) the chamber valve member (26) about its axis (9) to permit the change of orientation;

a sealing means (47) disposed around the windows (50) of the chamber valve member (26), and wherein said sealing means of the chamber valve member (26) in the body (10) is in grooves (39) and (42), and the sealing means comprises an elastomeric seal (47) having a double bearing surface, having the general shape of a U, the external parts of the U bearing against the faces (48) of the grooves (39) and (42), to which it is made to adhere, the extremity of each one of the limbs of the U forming the bearing surfaces (51) and (53) cooperating with the support on the internal wall of the body in order to ensure a seal around each window (50), the lower part of the U forming a path (55) directing leakages towards the space (67) formed in the lower part of the body.

2. Switching device according to claim 1, characterized in that the internal partition (33) is a plane partition situated in a plane passing through the common axis (9) of the body (10) and the chamber valve member (26).

3. Switching device according to claim 1, characterized in that it includes at least two superposed stages (12) and (12A), without communication between them, each stage of the chamber valve member being separated from the other by a plate (31) disposed perpendicular to the axis (9), each stage of the body (10) including four ports (11) disposed at 90° to one another, cooperating with the windows (50) of the chamber valve member.

4. Switching device according to claim 3, characterized in that the axes of the ports of a stage are offset by 45° with respect to the axes of the ports of the lower stage.

5. Switching device according to claim 1, characterized in that the seal (47) provides, by virtue of its shape, a sealing action in relation to the zones (67) and (67A) situated at the lower part and at the upper part of the body, this being a sealing action which is interrupted at short portions (66) on the external periphery of the plates (30) and (32) which is itself provided with notches (46) to constitute the continuity of the path (55) between the zones (67) and (67A) for the evacuation of leakages and of the rinsing liquid towards the exterior of the body through the tap (23).

6. Switching device according to claim 1, characterized in that the chamber valve member includes an internal path (36) bringing the upper space (67A) and the lower space (67) into communication with the atmosphere, when, during use of the switching device, the tap (23) is left open to monitor leakage, and thus permitting the application of a larger flowrate of rinsing liquid.

7. Switching device according to claim 1, characterized in that the rotating means (70) may be a geared electric motor or a pneumatic or hydraulic or manual actuator acting on the shaft (20), including a positioning means at the end of the orientation track and a control means permitting the driving-in of the chamber valve member into the body in the correct position, the assembly being disposed on a bracket (18) forming a solid unit with the cover (17).

8. Switching device according to claim 7, characterized in that the means for axially displacing (19) the chamber valve member in the body along the axis (9) comprises:

an assembly of four pairs of connecting rods (80) (83) (87) (88) forming a double quadrilateral, two pairs of connecting rods (87) (88) being shorter than the other two (80) (83) in order to obtain the irreversible locking position, the two quadrilaterals being disposed in two planes parallel to the axis (9), and joined by an upper fixed point (79) to the bracket (18), by the point (84) to the rod (20) for manipulating the chamber valve member (26), the lateral points being connected to one another by the hydraulic control jack, the point (81) being articulated to the body of the jack, the point (89) being articulated to the particular cap (90), which avoids the intersection with the rod (20), the articulation (84) forming a solid unit with a nut (85) threaded on the rod (20).

9. Switching device according to claim 8, characterized in that the upper fixed point (79) may be displaced on the bracket by means of a screw (92) in order to achieve an approach for the purpose of obtaining the optimum deformation of the seal (47) in the locked position.

10. Switching device according to claim 9, characterized in that the assembly comprising the mechanism for driving in and lifting the chamber valve member is suspended at the upper fixed point (79) and in that the residual constraints supplied to the rod (20) for example are reduced.

11. Switching device according to claim 8, characterized in that the nut (85) which supports the articulation (84), occupies, on the shaft (20), a fixed position determined by two abutments (86).

12. Switching device according to claim 8, characterized in that the bracket (18) includes two abutments (91), against which rests the shaft of the connecting rods (88) to ensure irreversibility of the quadrilateral system when the chamber valve member reaches its limiting position of driving-in into the body (10).

13. Switching device according to claim 8, characterized in that, when the chamber valve member is in the limiting position of driving-in, the angle formed by the connecting rods (87) and (88) at the point (89) is greater than 180°, so that the hydraulic thrust which is applied under the chamber valve member tends to press the shaft (89) against the abutments (91) of the bracket (18), thus making the system irreversible.

14. A fluid valve, said valve comprising:
a body member, said body member having a frustoconical inner surface of selected conicity and disposed symmetrically about a linear axis, said inner surface having a plurality of fluid ports;
a generally frustoconical chamber valve member disposed generally symmetrically about said linear axis, said chamber valve member having a conicity identical to said conicity of said inner surface of said body member, the frustoconical surface of said chamber valve member comprising a solid portion and a plurality of openings, said plurality of fluid ports and said plurality of openings being disposed to permit, by rotation of said chamber valve member to a preselected position about said linear axis, alignment of selected ones of said plurality fluid ports and said plurality of openings to form a plurality of unitary fluid passageways, said passageways being disposed to permit fluid to flow through said chamber valve member;
wherein said chamber valve member further comprises a deformable fluid seal disposed on the radially outer surface of said solid portion, said fluid seal being effective to form a fluid tight seal about each of said unitary passageways upon said frustoconical surface of said body member being placed against the frustoconical inner surface of said chamber valve member, and said deformable seal being deformed a preselected distance radially inwardly responsive to said chamber valve member being displaced a selected distance along said linear axis with respect to said body member, and wherein said deformable fluid seal comprises a plurality of interconnected channel means for collecting fluid leakage from said unitary fluid pasageways across said deformable fluid seal, said channel means being effective to drain said leakage out of said fluid valve.

15. The fluid valve of claim 14, wherein said solid portion of said chamber valve member comprises:
a plurality of disk members disposed along said linear axis and radially symmetrically about said linear axis, each of said disk members having two circular faces circumscribed by a circumference, said circumferences of said plurality of disk members together constituting one portion of said frustoconically inner surface of said chamber valve member;
one or more partitions, each of said one or more partitions having a pair of faces circumscribed by a perimeter, said pair of faces being disposed generally along said linear axis;
wherein one portion of said perimeter of each of said one or more partitions is joined to one of said faces of one of said plurality of disk members, another portion of said perimeter of said one or more partitions is joined to one of said faces of another of said plurality of disk members, and a third portion of said perimeter of each of said one or more partitions is disposed to constitute another portion of said frustoconical surface of said chamber valve member;
wherein said one portion and said another portion of said frustoconical surfaces of said chamber valve member comprise grooves effective to mountingly receive said deformable fluid seal.

16. The fluid valve of claim 15, wherein the size and shape of said deformable fluid seal and said grooves are selected to permit said deformable fluid seal to move radially into said grooves, said preselected radial distance inwardly responsive to said chamber valve member being displaced said preselected distance along said linear axis with respect to said body member.

17. The fluid valve of claim 16, wherein said fluid valve comprises a plurality of drain ports, said plurality of drain ports being disposed effective to permit the connection of said ports and said channel means into a fluid drain means for evacuating said fluid leakage from said fluid valve, said fluid drain means being further effective to permit washing fluid to be injected into, and drained from, said channels via said ports.

* * * * *